(12) United States Patent
Yamamoto et al.

(10) Patent No.: US 9,356,470 B2
(45) Date of Patent: May 31, 2016

(54) SYSTEMS AND METHODS FOR MANAGING A FUEL CELL

(71) Applicant: Intelligent Energy Limited, Loughborough, Leicestershire (GB)

(72) Inventors: Kei Edgardo Yamamoto, San Francisco, CA (US); Andrew Philip Gust Peterson, San Francisco, CA (US); Courtney Aline Helland, San Francisco, CA (US); Timothy Prowten, San Francisco, CA (US); Eric Allen Wooley, San Francisco, CA (US); Daniel Braithwaite, San Francisco, CA (US); Tibor Fabian, Mountain View, CA (US); Sergio Glavan, San Francisco, CA (US)

(73) Assignee: Intelligent Energy Limited, Loughborough (GB)

( * ) Notice: Subject to any disclaimer, the term of this patent is extended or adjusted under 35 U.S.C. 154(b) by 659 days.

(21) Appl. No.: 13/710,155

(22) Filed: Dec. 10, 2012

(65) Prior Publication Data
US 2013/0147276 A1 Jun. 13, 2013

Related U.S. Application Data

(60) Provisional application No. 61/569,133, filed on Dec. 9, 2011.

(51) Int. Cl.
*H02J 9/04* (2006.01)
*H02J 3/38* (2006.01)
*H02J 9/06* (2006.01)

(52) U.S. Cl.
CPC . *H02J 9/04* (2013.01); *H02J 3/387* (2013.01); *H02J 9/06* (2013.01); *Y02B 90/14* (2013.01); *Y10T 307/615* (2015.04)

(58) Field of Classification Search
CPC ............... H02J 3/387; H02J 9/04; H02J 9/06; Y02B 90/14; Y10T 307/615
USPC ......................................................... 307/64
See application file for complete search history.

(56) References Cited

U.S. PATENT DOCUMENTS

| 6,106,801 A | 8/2000 | Bogdanovic et al. |
| 6,534,950 B2 | 3/2003 | Leboe |

(Continued)

OTHER PUBLICATIONS

European Patent Application No. 12855422.7; Extended Search Report; dated Jan. 29, 2016; 7 pages.

*Primary Examiner* — Thienvu Tran
*Assistant Examiner* — Kevin J Comber
(74) *Attorney, Agent, or Firm* — Baker & Hostetler LLP

(57) ABSTRACT

A method of operating a power adapter that includes an energy storage device and a fuel cell system including a fuel supply and a fuel cell stack, the method including determining a connectivity state of an auxiliary power source and a load with the power adapter, and selecting a power adapter operation mode based on the connection states of the auxiliary power source and the load. The operation modes of the power adapter include at least an auxiliary mode when the auxiliary power source and the load are connected to the power adapter, and a fuel cell mode when the auxiliary power source is disconnected from the power adapter and the load is connected to the power adapter. The auxiliary mode includes providing power from the auxiliary power source to the load, and the fuel cell mode includes providing fuel cell power to the load.

20 Claims, 8 Drawing Sheets

(56) References Cited

U.S. PATENT DOCUMENTS

| | | |
|---|---|---|
| 2002/0114985 A1 | 8/2002 | Shkolnik et al. |
| 2004/0219409 A1 | 11/2004 | Isogai |
| 2006/0194082 A1 | 8/2006 | Tucker et al. |
| 2007/0031711 A1 | 2/2007 | Miyata et al. |
| 2008/0203816 A1 | 8/2008 | Fujita |
| 2011/0159386 A1 | 6/2011 | Kaupert et al. |
| 2011/0212375 A1 | 9/2011 | Taguchi et al. |
| 2011/0311895 A1* | 12/2011 | Spare et al. ............ 429/430 |

* cited by examiner

SYSTEMS AND METHODS FOR MANAGING A FUEL CELL

CROSS-REFERENCE TO RELATED APPLICATIONS

This application claims the benefit of U.S. Provisional Application No. 61/569,133 filed 9 Dec. 2011, which is incorporated in its entirety by this reference.

TECHNICAL FIELD

This invention relates generally to the fuel cell field, and more specifically to a new and useful system and method of managing a fuel cell system in the fuel cell field.

BACKGROUND

In many applications, fuel cell systems provide a compelling solution as a portable power source, due to their portability and low carbon footprint.

However, the fuel cell systems often require long startup times to bring the fuel cells and fuel cartridges up to operational temperatures. These long startup times can be prohibitive to wide consumer adoption of fuel cell systems as power sources, especially with the ubiquity of preexisting power sources, such as wall outlets connected to an electrical grid. However, since preexisting power sources tend to be immobile and not easily portable, it can be desirable for users to utilize preexisting power sources in certain settings and the fuel cell system in others.

Thus, there is a need in the fuel cell system field to create an improved system and method of allowing and leveraging multiple power source usage.

DESCRIPTION OF THE PREFERRED VARIATIONS

The following description of the preferred variations of the invention is not intended to limit the invention to these preferred variations, but rather to enable any person skilled in the art to make and use this invention.

1. The Power Adapter

Figure 1:
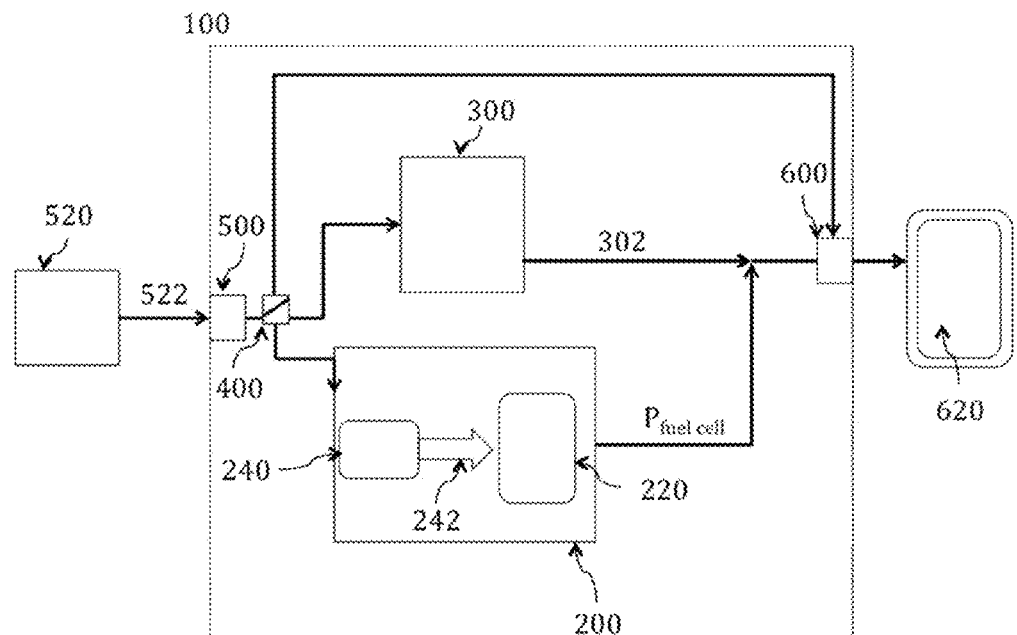
FIG. 1 is a schematic representation of a power adapter for a load.

As shown in FIG. 1, a system for managing a fuel cell includes a power adapter system 100 including a fuel cell system 200, a battery 300, and a control circuit 400. The fuel cell system 200 includes a fuel cell stack 220 and a fuel supply 240. The system can additionally include a load connector 600, an auxiliary power connector 500, a conversion circuit 700, a charging circuit, and an energy generation control system 900. The system is used to provide power to a load 620, wherein the load 620 is preferably a device, such as a portable consumer device such as a mobile phone, tablet, or laptop, but can alternatively be an electric vehicle, an unmanned aerial vehicle, or any other suitable load 620. The system is preferably external from the device, but can alternatively be integrated within the device, wherein the control circuit 400 is preferably the control circuit of the device. The system preferably removably couples to and receives power from an auxiliary power source 520, wherein the auxiliary power source 520 can be a power grid accessed through a wall outlet, a turbine, a solar panel system, or any other suitable power source capable of providing substantially continuous power for a given period of time. The power adapter 100 enables a device to be charged from both the fuel cell system 200 and the auxiliary power source 520. Furthermore, the power adapter 100 preferably leverages the power provided by the auxiliary power source 520 to start up and/or shut down fuel cell power production.

The fuel cell system 200 of the power adapter 100 functions to convert fuel into electric power. The fuel cell system 200 includes a fuel cell stack 220 and a fuel supply 240 that supplies fuel 242 to the fuel cell stack 220. The fuel cell system 200 is preferably a hydrogen fuel cell system 200 (e.g., the fuel supply 240 supplies hydrogen and the fuel cell stack 220 reacts hydrogen), but can alternatively be a methane, propane, butane, or any other suitable fuel cell system 200. The fuel cell system 200 is preferably an integral unit with the power adapter 100, but can alternatively be a removable unit, wherein the fuel cell system 200 provides power through a power connector to the power adapter 100.

The fuel cell stack 220 of the fuel cell system 200 functions to convert a fuel into electric power. The fuel cell stack 220 preferably includes one or more fuel cells. The fuel cells can be electrically coupled in series or in parallel within a fuel cell stack 220, and can be fluidly coupled in series or in parallel within the fuel cell stack 220 (e.g., through a fuel inlet or outlet manifold or an air inlet or outlet manifold). The fuel cells are preferably high temperature fuel cells, such as solid oxide fuel cells (SOFCs) or molten carbonate fuel cells (MCFCs), wherein the fuel cells must be brought up to a fuel cell operating temperature before fuel conversion can occur. However, the fuel cells can alternatively be low temperature fuel cells (e.g., proton exchange membrane (PEM) fuel cells) or any other suitable fuel cell. The fuel cell stack 220 preferably includes a single type of fuel cell, but can alternatively include a combination of different fuel cell types. The fuel cells are preferably planar, but can alternatively be tubular or any suitable shape. The fuel cell stack 220 preferably produces DC power, but can additionally include a conversion circuit 700 that converts the DC power into AC power. The fuel cell stack configuration is preferably device-specific, and preferably provides power at a voltage and current demanded by the device. However, the fuel cell stack 220 can be device-agnostic and provide power at a standardized voltage and current (e.g., 5V DC), non-standardized voltage and current, or at any other suitable voltage and current. The power adapter 100 can additionally include a conversion circuit 700 that converts the fuel cell stack power to power acceptable by the device, particularly when the fuel cell stack power is non-standard and non-device specific.

Figure 2:
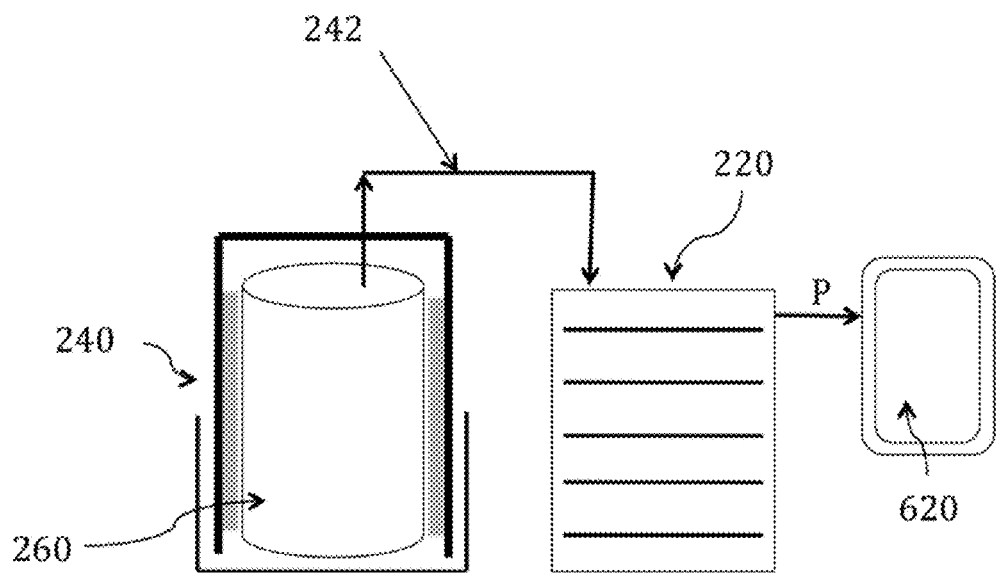
FIG. 2 is a schematic representation of a fuel generator.

The fuel supply 240 of the fuel cell system 200 functions to provide fuel to the fuel cell stack 220. The fuel supply outlet is preferably fluidly coupled to the fuel inlets of the fuel cells, but can alternatively be supplied to any suitable portion of the fuel cell stack 220. The fuel supply 240 is preferably a fuel generator, as shown in FIG. 2, but can alternatively be a pressurized fuel cartridge, wherein the fuel supply 240 preferably additionally includes a fuel supply valve and/or a fuel pump, or any other suitable fuel supply 240. The fuel generator preferably functions to generate and provide fuel for the fuel cell stack 220. The fuel generator preferably accepts a cartridge 260 containing a fuel storage composition, wherein the cartridge removably couples to the fuel generator. The fuel generator preferably includes a reaction element that reacts the fuel storage composition. The reaction element is preferably a heating element, wherein the fuel storage composition endothermically degrades to produce fuel, but can alternatively be electrical connections that power heaters within the cartridge, a pump that pumps a reactant to a fuel storage composition reaction front, a lighting system that selectively lights select portions of the fuel storage composition, a catalyst, or any other suitable reaction element. The fuel supply 240 is preferably an integral component with the fuel cell stack 220, but can alternatively be a separate component couplable to the fuel cell stack 220.

The fuel cartridge of the fuel cell system 200 functions to provide fuel to the fuel cell stack 220. As aforementioned, the fuel cartridge preferably contains a fuel storage composition that stores fuel in a chemically bound form, wherein the fuel storage composition preferably reacts to produce fuel. However, the fuel cartridge can contain compressed fuel or any other suitable form of fuel. The fuel storage composition preferably thermolyses at a degradation temperature to produce fuel, but can alternatively hydrolyze, catalyze, photolyze, or react using any suitable mechanism to produce fuel. The fuel storage composition is preferably aluminum hydride (Alane, preferably the α-polymorph, but alternatively any suitable polymorph), but can be sodium borohydride (SBH, $NaBH_4$), lithium hydride, or any other suitable hydrogen storage composition. The fuel storage composition is preferably a substantially solid pill of compacted powder, but can alternatively be loose powder, gel, liquid, or any other suitable form factor. The casing of the fuel cartridge is preferably substantially rigid to provide mechanical protection for the fuel storage composition. However, the casing can be substantially flexible. The casing is preferably thermally conductive such that the fuel storage composition can be heated through the casing, but can alternatively be insulated, such as with foam insulation or vacuum insulation. The casing is preferably made of metal (e.g., copper, aluminum, steel, or any suitable alloy), but can be made of a polymer, a ceramic, or any combination of the above. The casing is preferably cylindrical or prismatic, but can alternatively have any suitable form factor.

The battery or energy storage device 300 of the power adapter 100 functions to store and provide power to the fuel cell system 200 for fuel cell system operation. The battery 300 can additionally function to absorb excess energy produced by the fuel cell system 200, provide power to the load 620, condition power for the load 620, condition power for the fuel cell system 200, and/or provide power to an energy generation control system 900. The battery 300 is preferably rechargeable, and can be a lithium-ion, lithium polymer, nickel cadmium, silver zinc, or any other suitable rechargeable battery. The battery 300 is preferably substantially small to reduce the fuel cell system form factor, but can alternatively be large. The battery is preferably separate from the device battery, but can alternatively be the device battery. In a first variation, the battery capacity is only large enough to store enough energy to facilitate fuel cell system start-up (e.g., enough for fuel cell and/or cartridge heating to operational temperatures). In a second variation, the battery capacity is only large enough to store excess energy generated after load decoupling, wherein the battery capacity can be determined from the amount of fuel supplied to the fuel cell stack 220 after a fuel cessation signal is received. In a third variation, the battery capacity is large enough to sustain fuel cell operation for a given period of time, but not large enough to facilitate fuel cell system startup. In a fourth variation, the battery capacity is large enough to start-up and sustain fuel cell system operation for a period of time. In a fifth variation, the battery capacity is large enough to support multiple fuel cell system start-up cycles. In a sixth variation, the battery capacity is large enough to support device operation for a period of time. In a seventh variation, the battery capacity is large enough to fully charge the device. The battery 300 preferably provides power at a substantially constant voltage, wherein the constant voltage can be a standardized voltage, device specific voltage, device agnostic voltage, fuel cell system specific voltage, fuel cell stack specific voltage, fuel supply specific voltage, or any other suitable voltage. Alternatively, the battery 300 can provide power at a variable voltage. The battery 300 is preferably electrically connected to the fuel cell system 200, more preferably to a heating element of the fuel cell stack 220 (e.g., a resistive heater that heats the fuel cells) and/or a reaction element of the fuel supply 240 (e.g., to a resistive heating element of the fuel supply 240). The battery 300 preferably receives auxiliary power 522 and preferably electrically connects to the power source adapter. The battery 300 can additionally be electrically connected to the fuel cell stack power outlet, wherein the battery 300 preferably receives power from the fuel cell stack 220 after load disconnection and/or receives power in excess of load 620 demand during load 620 power provision. The battery 300 can additionally be electrically connected to the load connector 600, wherein the battery 300 can selectively provide power to the device through the adapter and/or receive power from the device.

The control circuit 400 of the power adapter 100 functions to control the power adapter operation modes. More preferably, the control circuit 400 controls power routing within the power adapter 100, but can alternatively control fuel cell system operation (e.g., maintaining the fuel cells and fuel cartridge at the respective operating temperatures), fuel routing, or control any other suitable adapter operation parameter. The control circuit 400 is preferably a processor (e.g., a CPU), but can alternatively be any suitable control system. The control circuit 400 is preferably electrically connected to the auxiliary power connector 500, the battery power inlet, the battery power outlet, the fuel cell system power inlet, the fuel cell system power outlet, and the load connector 600, but can alternatively be connected to a subset of the aforementioned components. The control circuit 400 preferably selectively routes power from the energy storage device and/or the auxiliary power source 520 based on the connectivity state of the power adapter 100 with the auxiliary power source 520 and a load 620. The control circuit 400 can additionally selectively route power based on the rate of power generation by the fuel cell system 200, the state of charge of the battery 300, the rate of battery power 302 consumption, the fuel provision rate, or any other suitable adapter operation parameter. The control circuit 400 is preferably operable between an auxiliary mode when the power adapter 100 is connected to the auxiliary power source 520 and a load 620 and a fuel cell mode when the power adapter 100 is disconnected from the auxiliary power source 520 and is connected to a load 620. The control circuit 400 can additionally be operable in a charging mode when the power adapter 100 is connected to the auxiliary power source 520 and is disconnected from a load 620. The control circuit 400 is preferably integrated into the power adapter 100, more preferably into the fuel cell system 200 of the power adapter 100, but can alternatively be integrated into any other suitable portion of the power adapter 100 or be located on a removable component of the power adapter 100.

The power adapter 100 can additionally include a load connector 600 that functions to transmit power from the power adapter 100 to the device. The load connector boo preferably includes a device plug, but can alternatively include any suitable electrical connection to the device battery. The device plug is preferably device-specific, but can alternatively be device-independent (e.g., a USB adapter). The device plug is preferably an industry-standardized plug, but can alternatively be a non-standardized plug. The load connector 600 is preferably permanently coupled to the power adapter 100, but can alternatively be removably coupled to the power adapter 100 with a coupling mechanism that includes an electrical connection (e.g., clip, tongue-in-groove couple, adhesive, etc.). The load connector 600 is preferably electrically connected to the fuel cell stack power outlet, and can additionally or alternatively be electrically connected to the battery 300. The load connector 600 is preferably additionally electrically connected to the auxiliary power connector 500 through the power adapter 100.

Figure 3:
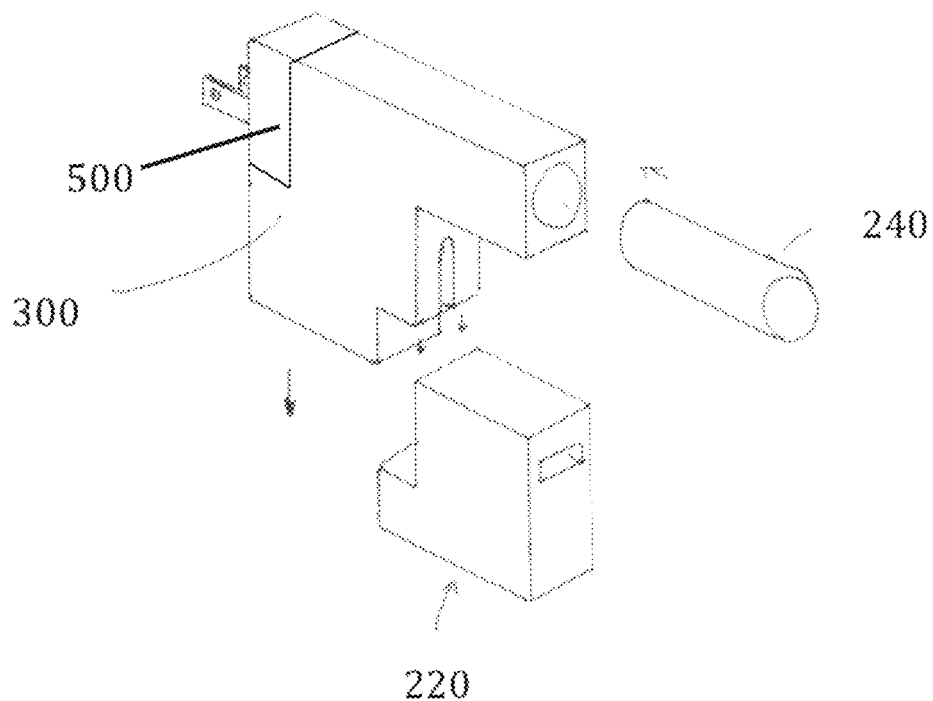
FIGS. 3-11 are schematic representations of a first, second, third, fourth, fifth, sixth, seventh, and eighth variation of a power adapter.
Figure 4:
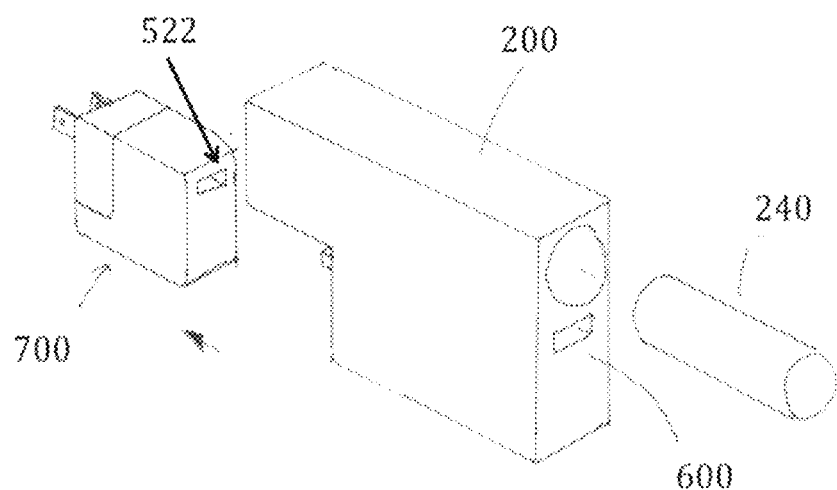

The power adapter 100 can additionally include an auxiliary power connector 500 that functions to couple to and transmit power from an auxiliary power source 520 to the power adapter 100. The auxiliary power source 520 is preferably a substantially larger power source, more preferably a substantially unlimited power source, but can alternatively be a limited power source. The auxiliary power connector 500 is preferably a plug for a wall outlet, wherein the auxiliary power source 520 is a wall outlet electrically coupled to an electric grid. However, the auxiliary power source 520 can be a diesel generator, a hydraulic energy generator, a wind turbine, or any other suitable power source, wherein the auxiliary power connector 500 is any suitable connector couplable to the auxiliary power sources 520 mentioned above. The auxiliary power connector 500 is preferably integrated into the power adapter 100, but can alternatively be removable, wherein the auxiliary power connector 500 can couple to the power adapter 100 with a coupling mechanism (e.g., clip, tongue-in-groove couple, adhesive, interference couple, friction couple, etc.) and provide power through a power connector (e.g., pins, electrical contacts, standardized connectors such as USB connections, etc.) to the power adapter 100 (as shown in FIGS. 3 and 4).

Figure 5:
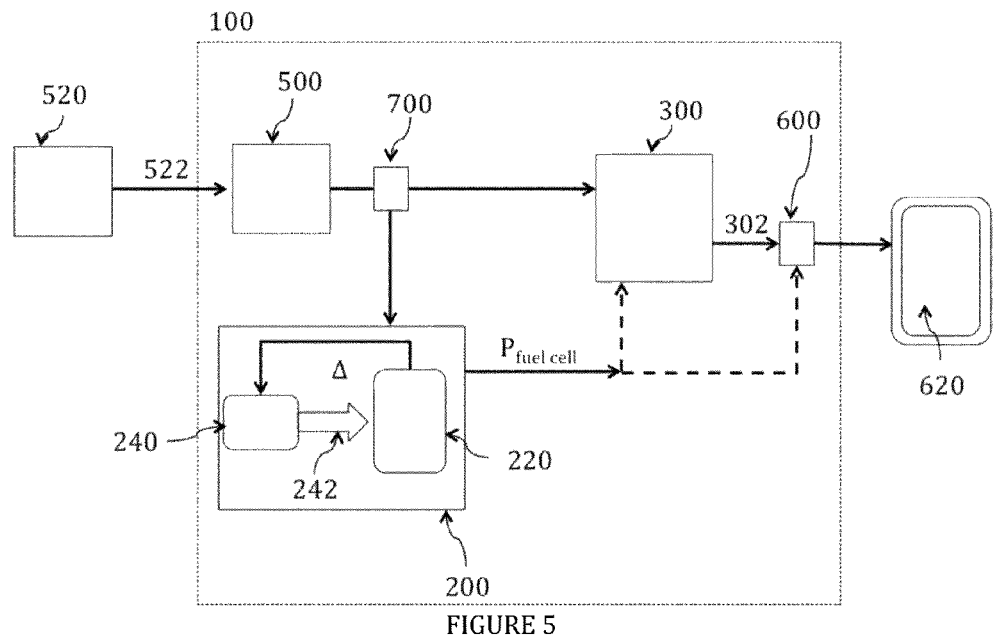
Figure 6:
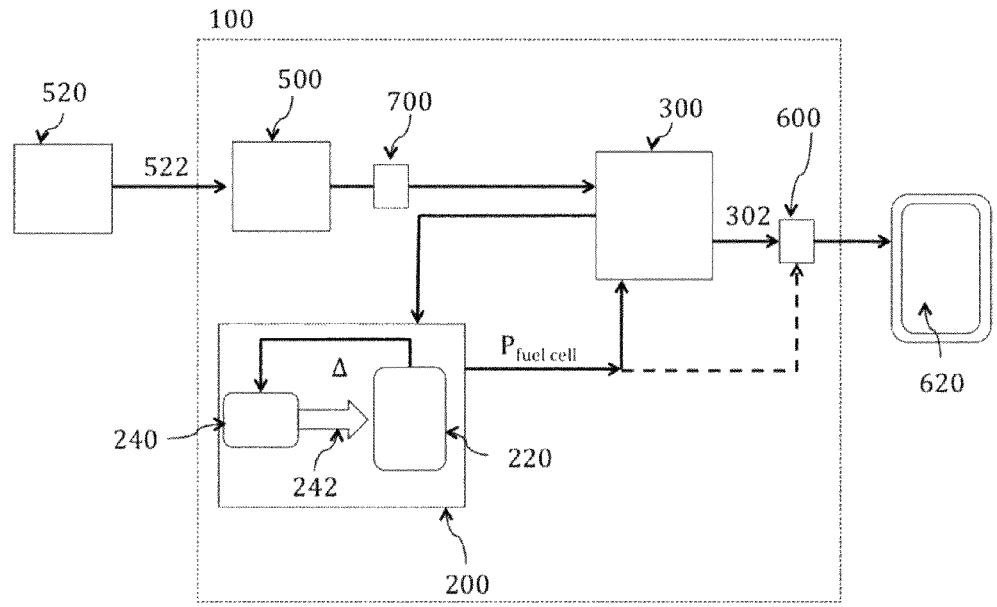
Figure 7:
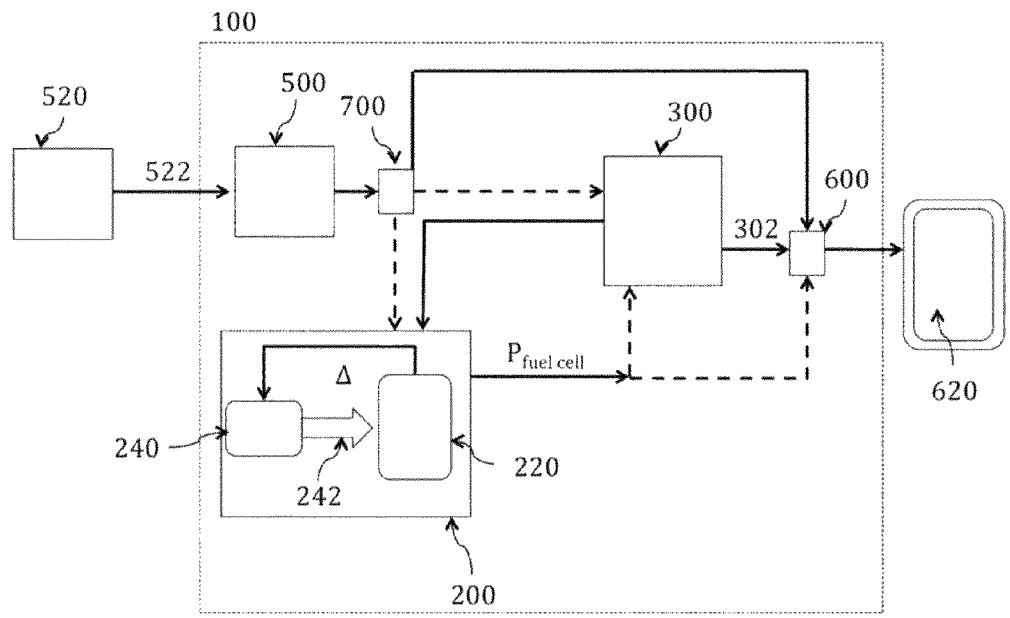
Figure 9:
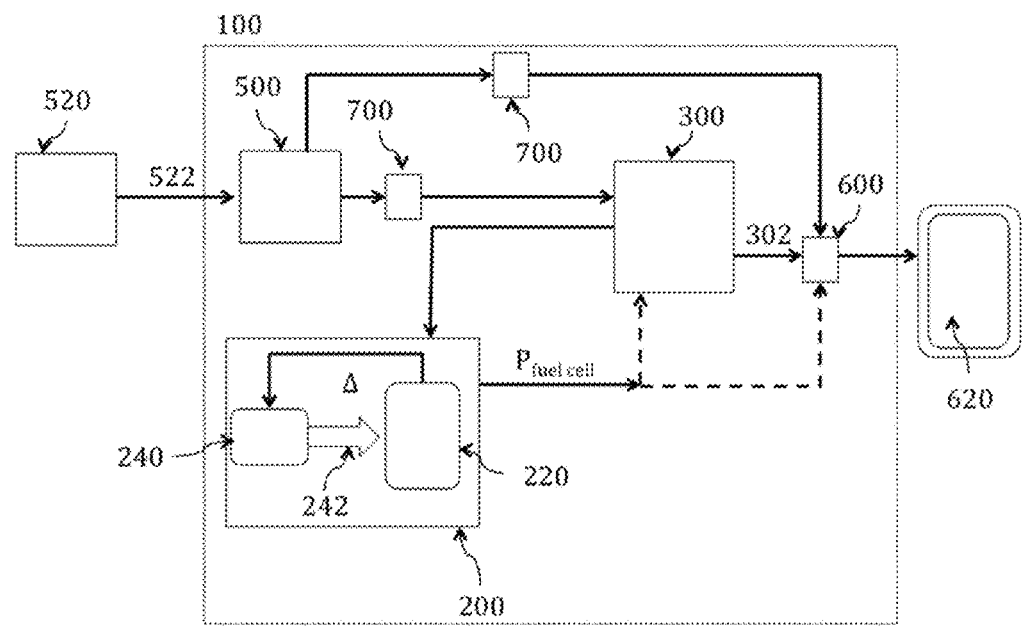

The power adapter 100 can additionally include a conversion circuit 700 that functions to convert auxiliary power 522 into power suitable for components of the power adapter 100 and/or the load 620. In a first variation, as shown in FIGS. 5 and 6, the conversion circuit 700 converts auxiliary power 522 into power suitable for the battery 300, wherein the conversion circuit 700 preferably includes a power converter electrically coupled between the auxiliary power connector 500 and the battery 300. This conversion circuit 700 can be located within the auxiliary power connector 500 or within the power adapter body. This conversion circuit 700 is preferably selected based on the auxiliary power source 520 for which the auxiliary power connector 500 was intended. This conversion circuit 700 preferably includes a power converter that converts auxiliary power 522 into battery power 302. In a second variation, the conversion circuit 700 can convert auxiliary power 522 into power suitable for the load 620, wherein the conversion circuit 700 preferably includes a power converter electrically coupled in the electrical path between the auxiliary power connector 500 and the load connector 600. The electrical path between the auxiliary power connector 500 and the load connector 600 can bypass the battery 300 (as shown in FIGS. 7 and 9) or include the battery 300, wherein the battery 300 functions as a component of the conversion circuit 700 (as shown in FIG. 5). This conversion circuit 700 can be located within the removable auxiliary power connector 500, within the power adapter body, or within the removable load connector 600. The conversion circuit 700 is preferably selected based on the intended device, but can be selected to meet a standard power outputs. In a third variation, the conversion circuit 700 can convert fuel cell system power into power suitable for the load 620, wherein the conversion circuit 700 is electrically connected between the fuel cell system power output and the load connector 600. In a fourth variation, the conversion circuit 700 can convert battery power 302 into power suitable for the fuel cell system 200, wherein the conversion circuit 700 is electrically connected between the battery 300 and the fuel cell system 200. The conversion circuit 700 can include one or a combination of the aforementioned variations, and be located in one or a combination of the aforementioned locations. The conversion circuit 700 can include an AC/DC conversion circuit, which can further enable the power adapter 100 to couple with an AC power supply (e.g., an electric grid). The conversion circuit 700 can additionally include a DC/DC conversion circuit, which preferably includes a step-up transformer, a step-down transformer, or both, and is preferably capable of transforming the provided power to the required device voltage. A DC/DC conversion circuit is preferably included when the auxiliary power source 520 provides DC power, when the battery 300 or fuel cell system power is converted into load power, or when battery power 302 is converted into fuel cell system power.

The power adapter 100 can additionally include a charging circuit that functions to control battery charging from the auxiliary power source 520 and the fuel cell system 200. The charging circuit can be a subcircuit of the conversion circuit 700, or can be a separate circuit. The charging circuit preferably controls the battery charging mode (e.g., charging or not charging), selection of the power source from which the battery 300 is charged, and the state of charge at which battery charging will be ceased, but can additionally control any other suitable battery charging parameter. The charging circuit preferably selects the battery charging mode based on the battery state of charge and the connection state of the power adapter 100 with the auxiliary power source 520 and the load 620. The charging mode is preferably selected when the battery state of charge is below a threshold state of charge and the power adapter 100 is connected to the auxiliary power source 520. The threshold state of charge is preferably less than the maximum battery capacity, such that the battery 300 can be used to absorb excess energy from the fuel cell system 200, but can alternatively be the maximum battery capacity or any other suitable capacity. The amount of power supplied to the battery 300 is preferably selected based on the state of charge of the battery 300 and the rate of power consumption from the battery 300, wherein the amount of power supplied to the battery 300 is preferably regulated to charge the battery 300 to the threshold state of charge. The non-charging mode is preferably selected when the auxiliary power source 520 is disconnected from the power adapter 100 and the load 620 is connected to the power adapter 100. The charging circuit can additionally select the charging mode based on the energy generation state of the fuel cell system 200, wherein the charging mode is preferably selected when the energy is being generated from the fuel cell system 200 and the load 620 is disconnected, or when the generated energy exceeds the load 620 demand when the load 620 is connected to the power adapter 100. The charging circuit preferably selects the power source from which the battery 300 is charged based on the connection state of the power adapter 100 with the auxiliary power source 520 and the energy generation state of the fuel cell system 200. The auxiliary power source 520 is preferably selected when the auxiliary power source 520 is connected to the power adapter 100 and the fuel cell system 200 is not generating energy. The fuel cell system 200 is preferably selected when the fuel cell system 200 is generating energy. The auxiliary power source 520 can additionally be selected when the fuel cell system 200 produces energy at a rate below the maximum charging rate of the battery 300. The charging circuit preferably selects the state of charge at which battery charging will be ceased based on the energy generation state of the fuel cell system 200. The charging circuit preferably allows the battery 300 to charge to the maximum capacity during energy generation, and selects a threshold state of charge below the maximum capacity when energy is not being generated.

Figure 15:
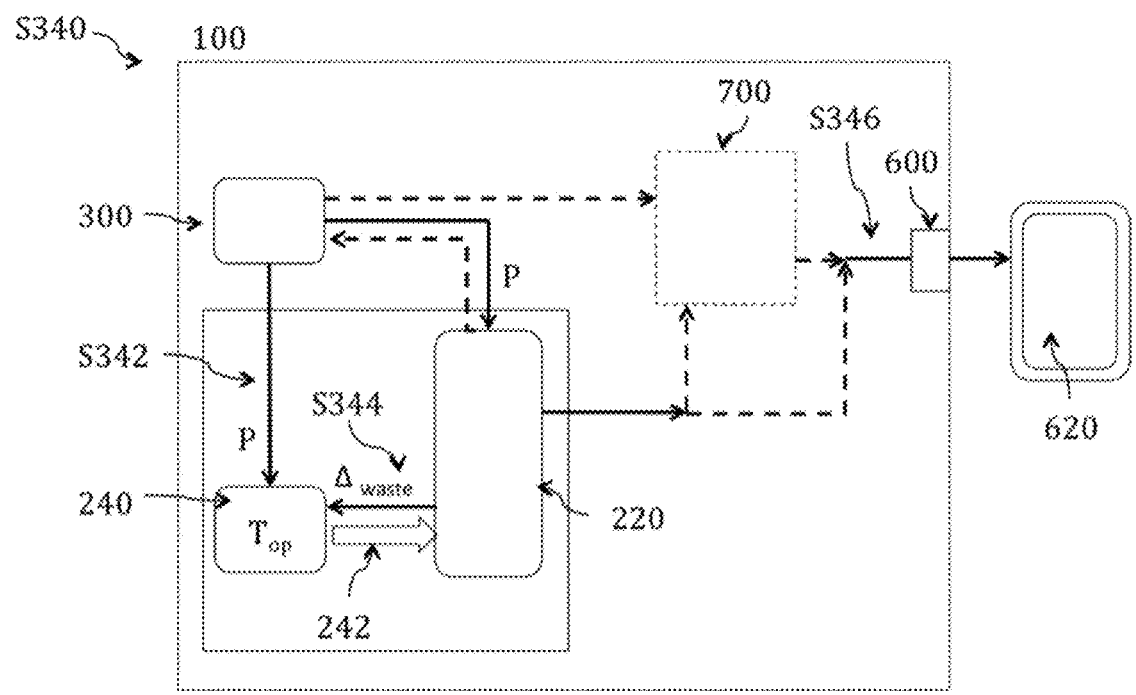
FIG. 15 is a schematic representation of the power adapter operating in a variation of the fuel cell mode.

As shown in FIG. 15, the power adapter 100 can additionally include an energy generation control system 900 that functions to control energy generation from the fuel cell system 200. More preferably, the energy generation control system 900 initiates and ceases energy generation, but can alternatively only initiate or only cease energy generation. The energy generation control system 900 preferably initiates fuel generation upon satisfaction of an initiation condition. The initiation condition is preferably satisfied when the load 620 is connected to the power adapter 100, the auxiliary power source 520 is disconnected from the power adapter 100, and a fuel cell system 200 parameter is indicative of fuel cell power production below a desired threshold, but can alternatively be satisfied when the battery state of charge falls below a critical threshold or when any other suitable event indicative of fuel cell power demand occurs. The energy generation control system 900 preferably ceases energy generation upon the satisfaction of a cessation condition. The cessation condition is preferably satisfied when the load 620 is disconnected from the power adapter 100 and a fuel cell system 200 parameter is indicative of power production (e.g., the fuel flow rate is above a predetermined flow rate, the fuel generator temperature is above the decomposition threshold, etc.), but can alternatively be satisfied when the fuel cartridge capacity falls below a predetermined threshold, or when any other suitable event indicative of a drop in fuel cell power demand occurs. The energy generation control system 900 preferably controls energy generation by controlling fuel flow to the fuel cell stack 220, but can alternatively control energy generation by controlling fuel cell stack 220 operation parameters, such as the air provision rate or the fuel cell stack 220 temperature. The energy generation control system 900 is preferably a cooling system (e.g., a fan, cold plate, etc.) that selectively thermally couples a cooling fluid (e.g., ambient air, coolant, a volatile liquid, etc.) with a fuel cell system 200 component to cease energy generation, but can alternatively be a venting system that vents heat and/or fuel to the environment to cease energy generation, a flow controller that controls fuel flow to the fuel cell stack 220 (e.g., a pump that selectively pumps fuel to the fuel cell stack 220 or active valve that selectively seals the fuel connection between the fuel supply 240 and the fuel cell stack 220) to initiate and/or cease energy generation, a circuit that controls power provision to fuel cell system 200 components (e.g., to the heater elements of the fuel generator and/or the fuel cell system 200) to initiate and/or cease energy generation, or any other suitable system capable of controlling energy generation initiation and/or cessation.

The power adapter 100 can additionally include a sensor that measures a parameter of power adapter operation, wherein the measurement is preferably received and processed by the processor. Examples of sensors that can be included in the power adapter 100 include a temperature sensor, flow meter, resistance meter, voltage meter, current meter, optical sensor, or any other suitable measurement device. Examples of power adapter operation parameters that can be measured include the temperature of the fuel cell stack 220, the temperature of the fuel supply 240, the temperature of the fuel storage composition, battery state of charge, the power supplied by the fuel cell stack 220, the fuel flow rate into the fuel cell stack 220, the coolant flow rate from the fuel cell stack 220, the temperature of the coolant stream (before and/or after cooling the fuel cell stack 220), the power supplied by the auxiliary power source 520, or any other suitable operational parameter.

The power adapter 100 can additionally include on-board memory that functions to store battery- or fuel cell system-related data. Fuel cell system-related data can include the operating temperature of the fuel cells and fuel cartridge, the fuel cell system identifier, the amount of cartridge consumption (e.g., as determined from the fuel flow rate, cartridge operation time, etc.), or any other suitable fuel cell system-related data. The memory is preferably non-volatile (e.g., MRAM, flash memory, etc.), but can alternatively be any suitable memory.

The power adapter 100 can additionally include a casing that functions to enclose and mechanically protect the power adapter components. The casing is preferably substantially rigid, but can alternatively be substantially flexible. The casing is preferably thermally insulated (e.g., vacuum insulated, foam insulated, etc.) but can alternatively be thermally conductive. The casing is preferably substantially prismatic, and can include angled corners, rounded corners, rounded edges, or have any other suitable configuration or geometry.

In a first variation, the power adapter 100 includes a first portion including the fuel cell system 200 integrated with the load connector 600 and a second portion including a conversion circuit 700 and the auxiliary power connector 500. The first portion preferably removably couples to the second portion. The first portion is preferably substantially portable, with a small form factor (e.g., the largest dimension is under 100 mm, alternatively larger). The second portion is preferably also substantially portable with a small form factor (e.g., under 100 mm, alternatively larger), but can alternatively be a stationary dock. In one variation, the dock can include replacement fuel cartridges, and can replace the cartridges within the fuel cell system 200.

Figure 10:
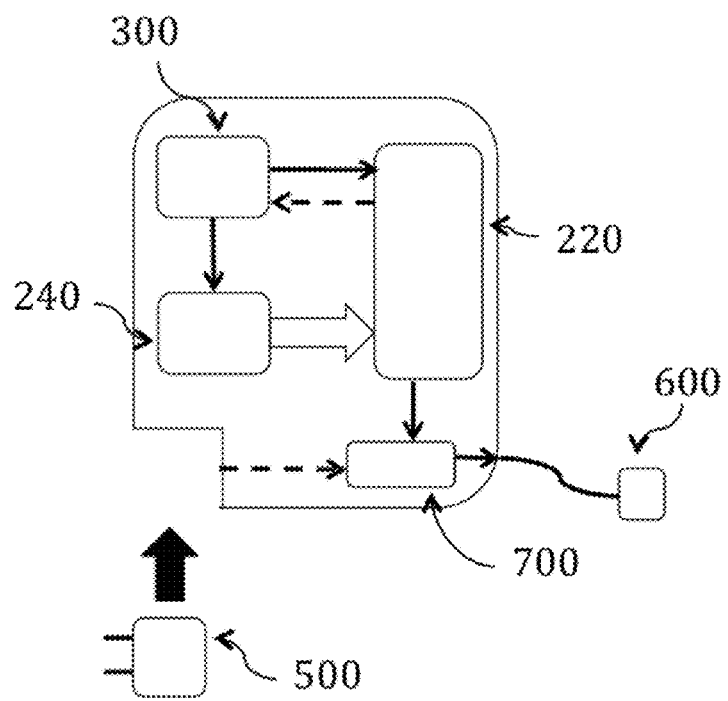

In a second variation, as shown in FIG. 10, the power adapter 100 includes a first portion including the fuel cell system 200 integrated with the conversion circuit 700 and the load connector 600 and a second portion including the auxiliary power connector 500. The first portion preferably removably couples to the second portion. The entire power adapter 100 (with the first portion coupled to the second portion) is preferably substantially portable, with a small form factor (e.g., under 100 mm, alternatively larger).

Figure 11:
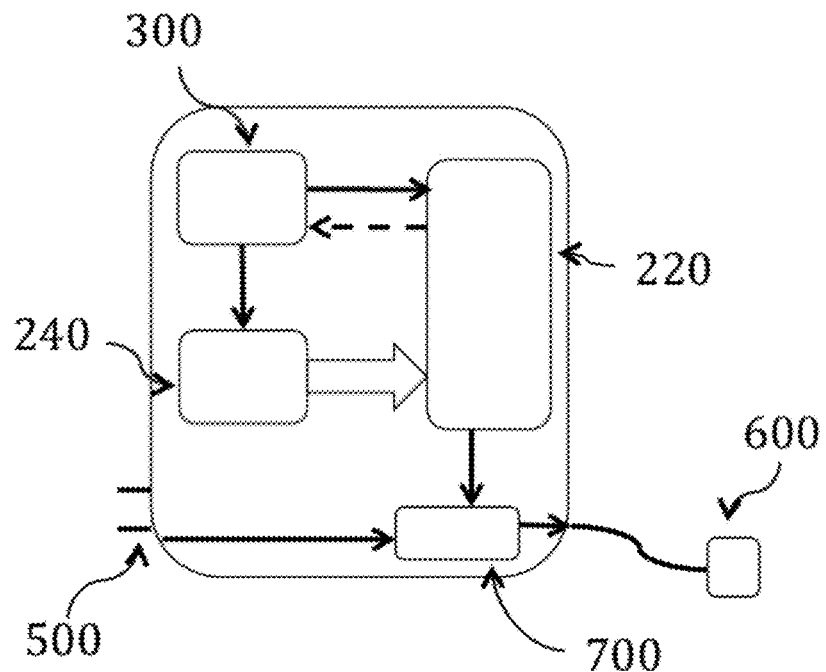

In a third variation, as shown in FIG. 11, the power adapter 100 is a single unit including the fuel cell system 200 integrated with the load connector 600, the conversion circuit 700, and the auxiliary power connector 500. The auxiliary power connector 500 is preferably a plug, wherein the prongs of the plug can be folded into the body of the power adapter 100.

In a fourth variation, as shown in FIG. 3, the power adapter 100 includes a body with a battery 300 and the conversion circuit 700, wherein the fuel supply 240 within the body accepts a cartridge. The cartridge preferably includes fuel storage composition, wherein the fuel supply 240 is a fuel generator, but can alternatively include a compressed volume of fuel or fuel in any suitable form. Insulation for the cartridge is preferably removable with the cartridge, but can alternatively be located within the body. The auxiliary power connector 500 removably couples to the power adapter body. The fuel cell stack 220 also removably couples to the power adapter body, wherein the fuel cell stack 220 additionally includes a cooling fan, fuel manifolds, and any other auxiliary mechanisms required for fuel conversion to electric power. In one variation, the fuel cell stack 220 couples to the same port on the power adapter body as the auxiliary power connector 500, wherein the port includes both a power transmission mechanism (e.g., electrical contacts) and a fuel outlet. In another variation of this variation, the electronics of the power adapter 100 are divided into separate circuits: a conversion circuit 700 for auxiliary power 522 to device power conversion; a cartridge circuit that controls fuel generation, device charging from the battery 300, and battery 300 to device power conversion; and a fuel cell circuit that controls fuel cell stack 220 operation.

In a fifth variation, as shown in FIG. 4, the power adapter 100 includes a body that includes a fuel cell stack 220, a battery 300, and the electronics for both fuel cell system operation and power conversion (from the auxiliary power source 520 and/or the battery 300). The body can additionally include any auxiliary mechanisms required for fuel cell function. The auxiliary power source 520 preferably removably couples to the body through an electrical couple 522. The cartridge preferably removably couples to the body as well, more preferably to the same port as the auxiliary power connector 500 but alternatively through another port. Similar to the fourth variation, the electronics can be included all within the body or can be distributed between the body and auxiliary power connector 500.

Figure 8:
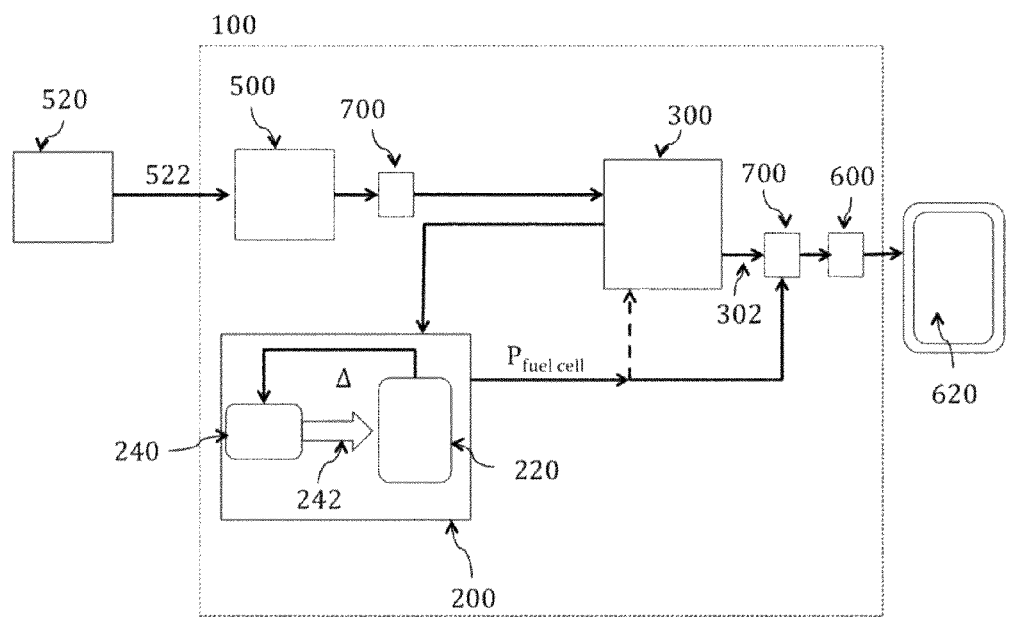

In a sixth variation, as shown in FIG. 7, the power adapter 100 includes a conversion circuit 700 electrically connecting an auxiliary power connector 500 to a battery 300, wherein the battery 300 is electrically connected to a fuel cell system 200, wherein the fuel cell system 200 is electrically connected to the load connector 600. The conversion circuit 700 converts auxiliary power 522 into power suitable for the battery 300, and can include an AC/DC converter. The battery 300 is preferably configured to provide power suitable for powering the fuel cell system 200. However, when the battery 300 does not provide power suitable for powering the fuel cell system 200, the electrical connection between the battery 300 and the fuel cell system 200 can additionally include a second conversion circuit 700 that converts battery power 302 into power suitable for the fuel cell system 200, such as power suitable to heat the fuel cells of the fuel cell stack 220 or power suitable for the fuel generator of the fuel supply 240. The fuel cell system 200 is preferably configured to provide power suitable for the device. However, when the fuel cell system 200 does not provide power suitable for the device, and the load connector 600 can additionally include a third conversion circuit 700 that converts fuel cell stack power to device power as shown in FIG. 8. As shown in FIG. 7, the auxiliary power connector 500 can additionally be electrically connected to the load connector 600, wherein the auxiliary power connector 500 and load connector 600 are preferably connected through the first conversion circuit 700 (e.g., the output of the first conversion circuit 700 is provided to the load connector 600), but can alternatively be connected through a fourth conversion circuit 700 that converts auxiliary power 522 into power suitable for the device, as shown in FIG. 9, or be connected through the third conversion circuit 700 wherein auxiliary power 522 or power from the first conversion circuit 700 is fed into the third conversion circuit 700. As shown in FIG. 7, the battery 300 can additionally be electrically connected to the load connector 600, wherein the battery 300 can be directly electrically connected to the device, connected to the device through the third conversion circuit 700 as shown in FIG. 7, or be electrically connected through a fifth conversion circuit 700 that converts battery power 302 into power suitable for the device. As shown in FIG. 7, the power outlet of the fuel cell system 200 can additionally be electrically connected to the battery power inlet, wherein the fuel cell system power outlet is preferably directly connected to the battery power inlet, but can alternatively be connected through a sixth conversion circuit 700 that converts the fuel cell system power into power suitable for the battery 300.

In a seventh variation as shown in FIG. 6, the power adapter 100 includes a power converter 700 electrically connecting an auxiliary power connector 500 to a battery 300, wherein the battery 300 is electrically connected to a fuel cell system 200 and a load connector 600, and wherein the fuel cell system power outlet is electrically connected to the battery power inlet. The battery 300 preferably outputs power suitable for the device, but can alternatively include a second power converter electrically connecting the battery power outlet to the load connector 600, wherein the second power converter converts battery power 302 into power suitable for the device. In this manner, the first power converter, the battery 300, and the second power converter, if used, can function as a conversion circuit 700 that converts auxiliary power 522 into power suitable for the device. The fuel cell system 200 is preferably compatible with battery power 302 output, but the battery 300 can additionally include a third power converter electrically connecting the battery power outlet to the fuel cell system 200, wherein the third power converter converts battery power 302 into power suitable for the fuel cell system 200.

However, the power adapter 100 can have any other suitable physical and/or electrical configuration.

2. Methods and Modes of Power Adapter Operation

Figure 12:
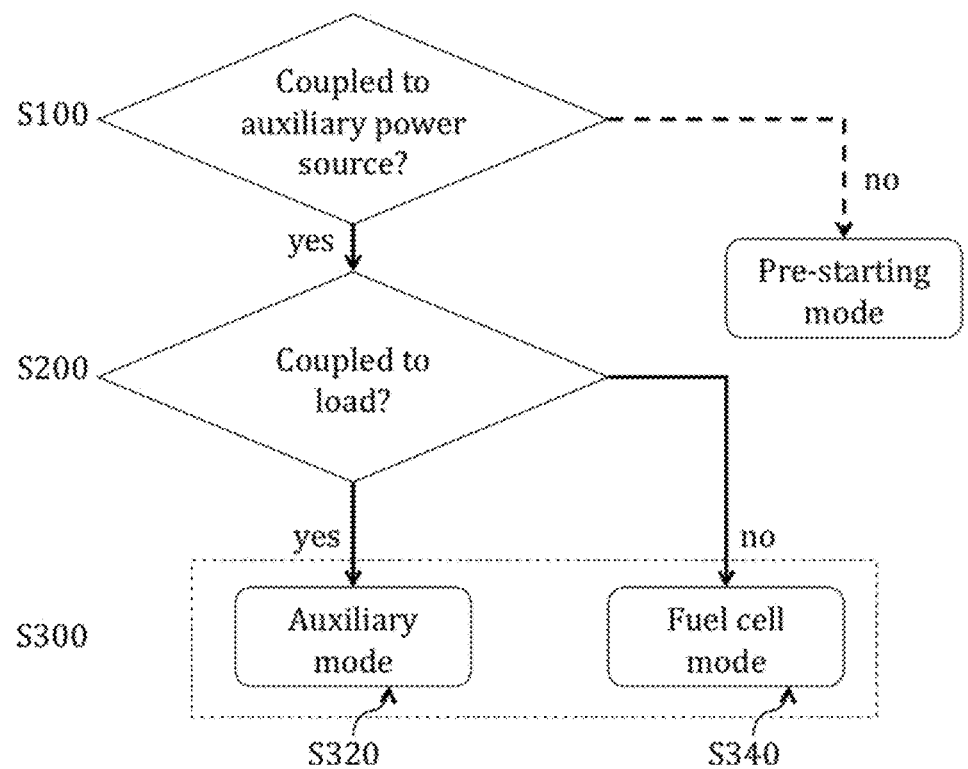
FIG. 12 is a schematic representation of a method of power adapter operation.

As shown in FIG. 12, a method of operating a power adapter includes determining a connectivity state of an auxiliary power source with the power adapter S100, determining a connectivity state of a load with the power adapter S200, and selecting and operating the power adapter in an operation mode based on the connectivity state of the power adapter with the auxiliary power source and the load S300, the operation modes including an auxiliary mode and a fuel cell mode. The power adapter can additionally be operable in a charging or pre-starting mode, based on the connectivity state of the power adapter with the auxiliary power source and the load. The power adapter preferably automatically determines the suitable operational mode, but can alternatively be manually switched from one mode to another. The operational mode is preferably determined by the control circuit, but the operational modes can alternatively be determined by any other suitable component or be passively determined. The power adapter utilizing this method is preferably substantially similar to the one described above, but can alternatively be any suitable power adapter with a fuel cell system and battery that is couplable to an auxiliary power source and a load.

Determining the connectivity state of the auxiliary power source S100 functions to determine the availability of auxiliary power. Determining the connectivity state of the auxiliary power source can include detecting a potential difference at the auxiliary power connector wherein the auxiliary power source is connected when a potential difference over a predetermined voltage threshold is detected, detecting a current flow from the auxiliary power connector wherein the auxiliary power source is connected when a current over a predetermined current threshold is detected, mechanically determining that the auxiliary power connector is coupled to an auxiliary power source (e.g., a tab in the connector is actuated when the auxiliary power connector is coupled), or detecting the connectivity state of the auxiliary power source in any other suitable manner. The connectivity state of the auxiliary power source is preferably determined by the control circuit, but can alternatively be determined by any suitable component of the power adapter.

Determining the connectivity state of the load S200 functions to determine the need for power provision. Determining the connectivity state of the load source can include detecting a load at the device connector (e.g., determining a resistance at the device connector), detecting a power request from the device connector (e.g., an electrical signal), detecting a power draw from the device connector, mechanically determining that the device connector is coupled to a load (e.g., a tab in the connector is actuated when the device connector is coupled), or detecting the connectivity state of the load in any other suitable manner. The connectivity state of the load is preferably determined by the control circuit, but can alternatively be determined by any suitable component of the power adapter. When the power adapter is integrated within the device, the load is preferably always determined to be connected, but can alternatively be determined to be disconnected (e.g. wherein the device disconnects the device battery from the power adapter, when the device is shut off, etc.).

Figure 13:
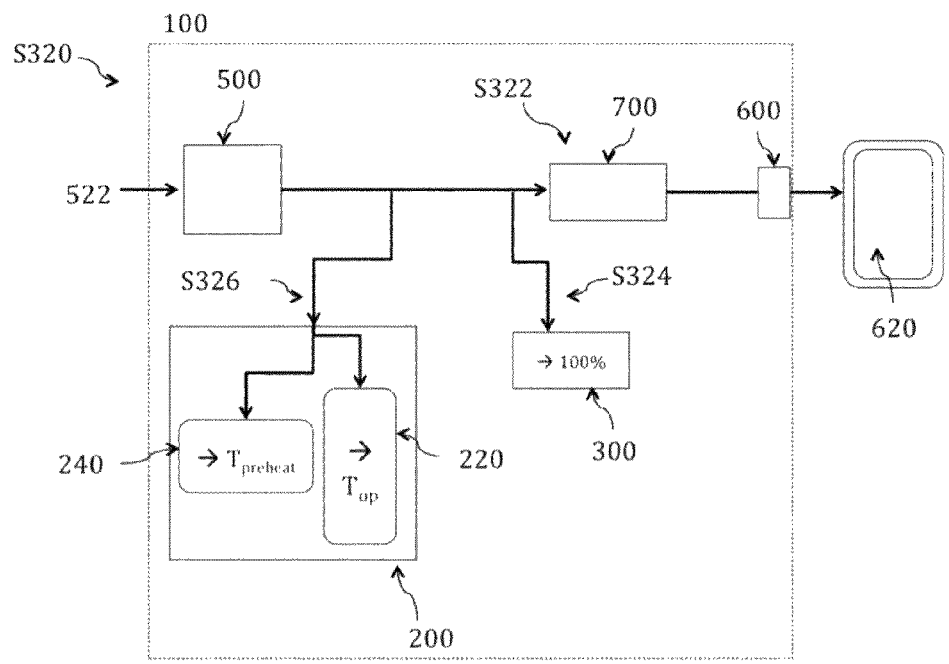
FIG. 13 is a schematic representation of the power adapter operating in a variation of the auxiliary mode.

The power adapter is preferably operated in auxiliary mode when the power adapter is coupled to both the auxiliary power source and the load. As shown in FIG. 13, operating the power adapter in auxiliary mode S320 preferably includes providing power to the load S322. Operating the power adapter in auxiliary mode can additionally include charging the battery to a predetermined state of charge S322. Operating the power adapter in auxiliary mode can additionally include pre-starting the fuel cell system S324.

Providing power to the load S322 can include providing power from the auxiliary power source to the load and/or providing power from the battery to the load. Providing power from the auxiliary power source to the load can include directly routing the auxiliary power source to the device connector (e.g., without any intervening power conditioning). Providing power from the auxiliary power source to the load can alternatively include routing the auxiliary power through a power conversion circuit that converts the auxiliary power into power suitable for the device, and routing the converted power to the load. The power conversion circuit preferably includes a power converter, such as an AC/DC converter or a DC/DC converter, but can additionally include the battery, wherein the battery power output is suitable for the device. Providing power from the battery to the load can include directly routing the battery power to the device connector. Providing power from the battery to the load can alternatively include routing the auxiliary power through a power conversion circuit that converts the battery power into power suitable for the device, and routing the converted power to the device connector. Providing power to the load can additionally include providing power to the load from the fuel cell system, wherein the fuel cell system power can be directly provided to the load or converted then provided to the load. The load is preferably powered by the fuel cell system if the fuel cell system was generating power prior to auxiliary power source and/or load coupling to the power adapter.

Charging the battery to a predetermined state of charge S324 functions to provide the battery with enough power to facilitate fuel cell system operation after the power adapter is disconnected from the auxiliary power source. The predetermined state of charge is preferably less than the maximum battery capacity. This can be preferable if the fuel cartridge is heated to a temperature above the degradation temperature at the time at which the power adapter is placed in the auxiliary mode, wherein the fuel cell stack preferably converts the excess fuel into electric power, which is subsequently stored by the battery. Alternatively, the predetermined state of charge can be the maximum battery capacity, wherein subsequent power consumption of battery power by the fuel cell system can provide the space within the battery for absorption of excess fuel cell power. Charging the battery preferably includes charging the battery from the auxiliary power supply, wherein charging the battery from the auxiliary power supply can include directly providing power to the battery from the auxiliary power, or routing auxiliary power through a power conversion circuit (e.g., a power converter), then routing the converted power to the battery. Charging the battery can additionally or alternatively include charging the battery from the fuel cell stack. The battery is preferably charged from the fuel cell stack when the power adapter is disconnected from the auxiliary power source, but can alternatively be charged from the fuel cell stack when the power adapter is connected to the auxiliary power source, particularly when the fuel cell stack was in operation prior to auxiliary power source connection. The battery preferably absorbs the excess energy from load charging, such that the battery preferably receives the entirety of the power generated by the fuel cell system when the load is disconnected from the power adapter.

Pre-starting the fuel cell system S326 functions to place the fuel cell system in a state capable of producing substantially on-demand power after auxiliary power source disconnection from the power adapter. The fuel cell system can be pre-started whenever the fuel cell system is connected to the auxiliary power source, or can be pre-started only when the fuel cell system is in auxiliary mode, wherein the power adapter is connected to both the auxiliary power source and the load. Pre-starting the fuel cell system preferably includes pre-heating a fuel cell of the fuel cell stack, more preferably pre-heating a portion of the fuel cells of the fuel cell stack or pre-heating all the fuel cells of the fuel cell stack. Pre-heating a fuel cell stack preferably includes heating the fuel cell to the fuel cell operational temperature, preferably by providing power to the fuel cell from the auxiliary power source and resistively or otherwise heating the fuel cell, but alternatively by providing power or heat from any other suitable source (e.g., waste heat from the device). Pre-starting the fuel cell system preferably additionally includes pre-starting the fuel source, but the fuel source can alternatively not be pre-started. Pre-starting the fuel source preferably includes pre-heating the fuel storage composition to a temperature near but below the decomposition temperature (e.g., within several degrees F. of the degradation temperature), such that no fuel is produced, but a small energy input from the battery will induce degradation of the fuel storage composition to produce fuel. This variation is preferably utilized when the estimated fuel that can be produced from the cartridge is over a fuel threshold, but can alternately be used under other conditions. However, pre-starting the fuel source can alternatively include all but the last steps required for fuel generation or fuel supply (e.g., starting up the fuel or reactant pump). Pre-starting the fuel source preferably includes providing power from the auxiliary power source to the fuel source (e.g., to resistively heat the fuel generator), but can alternatively include providing power and/or heat from the battery, fuel cell stack, device, or any other suitable component.

Operating the power adapter in auxiliary mode S320 can additionally include measuring a fuel cell system parameter indicative of power generation when the power adapter is determined to be connected to the auxiliary power source and ceasing power generation when the parameter measurement indicates power generation S327. These steps function to reduce fuel cell system use while the power adapter is connected to the auxiliary power source, conserving the fuel source for disconnected use. Measuring the fuel cell system parameter indicative of power generation preferably includes measuring a parameter indicative of fuel provision to the fuel cell stack (e.g., fuel storage composition temperature, fuel generator temperature, fuel flow rate, etc.), but can alternatively include measuring the fuel cell stack temperature, the power production rate, or any other suitable parameter. The measured parameter can be indicative of power generation when fuel generator or fuel storage composition temperature exceeds the decomposition temperature, when the fuel flow rate is non-zero or above a predetermined threshold, the power production rate is above a predetermined rate, the fuel cell stack temperature is above the operational temperature, or can be any other suitable condition indicative of power generation. Ceasing power generation preferably leverages the auxiliary power source to cease power generation, but can alternatively otherwise cease power generation. Ceasing power generation preferably includes cooling a fuel cell system component, but can alternatively include ceasing fuel provision to the fuel cell system (e.g., halting fuel or reactant pumping) or any other suitable means of ceasing fuel cell system power generation. Power from the auxiliary power supply is preferably used to cool the fuel cell system, but battery power can additionally or alternatively be used. Cooling the fuel cell system preferably includes cooling the fuel supply, but can alternatively and/or additionally include cooling the fuel cell stack.

Ceasing power generation from the fuel cell system is preferably used when the power adapter is coupled to an auxiliary power source while the fuel cell system is still in operation. For example, a user can be charging a device with the fuel cell system, finds a wall outlet, and plugs the power adapter into the wall outlet. By using the power from the wall outlet to cease power generation from the fuel cell system, the power adapter can function to shut down the fuel cell system and conserve the fuel cartridge and/or fuel cell system lifespan while still providing adequate power to the load. Cooling the fuel cell system can also be used when the load (e.g., device) is decoupled from the power adapter. Cooling the fuel cell system can also be used during cartridge replacement, wherein the power adapter cools the cartridge to a replacement temperature. This is preferably used when the power adapter determines that cartridge temperature is over a replacement threshold (e.g., over 50° C.) and the amount of fuel that can be produced from the cartridge is deemed to be lower than a fuel threshold (e.g., the cartridge is deemed substantially consumed).

Cooling the fuel cell system preferably includes cooling the fuel supply to a temperature just under the degradation temperature (e.g., within several degrees F. of the degradation temperature) to cease fuel production. However, the fuel storage composition can be cooled to or below 50° C., ambient temperature, or to any other suitable temperature that allows for user handling. Cooling systems that can be used include a fan (e.g., convective cooling), a cold plate, a piezoelectric heat pump, or any other suitable cooling system. While the fuel supply is cooling, the fuel cell stack is preferably maintained at the operational temperature to convert the excess fuel produced by the fuel supply into power, which is preferably subsequently stored in the battery. However, the fuel cell stack can be cooled below the operational temperature, wherein the excess fuel is preferably vented into the ambient environment.

Cooling the fuel cell system can additionally facilitate cartridge replacement in addition to cooling the cartridge down to the replacement temperature. In one example, the fuel cell system automatically exchanges the consumed cartridge for a fresh cartridge, wherein the power adapter is preferably a dock holding multiple cartridges. In a second example, the fuel cell system ejects the consumed cartridge. Ejection is preferably performed after the cartridge temperature has fallen below a threshold temperature, wherein temperature-dependent retention mechanisms (e.g., shape-memory material, leveraging the expansion and contraction of materials under different temperatures, a mechanism that is operational in different modes dependent on a reading from a temperature sensor, etc.) preferably control the cartridge ejection. In a third example, the fuel cell system presents a replacement indicator. The replacement indicator can be a light on the power adapter, a message displayed on the device (e.g., wherein the power adapter generates and sends the message, wherein the device determines the cartridge state, etc.), a power adapter color change, a sound, or any other suitable indicator to the user that the cartridge should be replaced.

Alternatively, any suitable combination of the variations described above can be used in the auxiliary mode.

The power adapter preferably operates in fuel cell mode S340 when the power adapter is decoupled from the auxiliary power source. Operating in fuel cell mode S340 preferably provides power to the load from the fuel cell system S346. Operating in fuel cell mode preferably additionally includes initiating fuel source operation S342 and maintaining fuel source operation S344. The battery preferably initially provides energy for fuel source operation until a predetermined fuel cell stack temperature is reached, after which waste heat from the fuel cell stack is preferably routed to the fuel generator to maintain fuel production. Fuel generator heating can additionally be supplemented by waste heat and/or power from the battery. However, fuel supply operation can be sustained by battery power throughout utilization of the fuel cell mode. The battery can additionally provide power to the fuel cell stack to bring the fuel cells up to operational temperature, particularly when the power adapter was not operating in auxiliary mode prior to fuel cell mode operation.

Initiating fuel source operation S342 functions to start fuel production. The fuel source is preferably pre-heated when in the auxiliary mode, wherein battery power is preferably used to start fuel production from the fuel source. In one variation, battery power is preferably used to heat the fuel source to the decomposition temperature (e.g., through resistive heating). In another variation, heat from the fuel cell stack is preferably used to heat the fuel source to the decomposition temperature, wherein battery power can be used to supplement fuel source heating. In another variation, battery power is used to pump a reactant to a reaction front at the fuel storage composition. In another variation, battery power is used to pump pressurized fuel from a pressurized fuel cartridge to the fuel generator. However, any other suitable method of initiating fuel flow to the fuel cell stack can be used.

Maintaining fuel source operation S344 functions to provide fuel at a given rate to the fuel cell stack. Maintaining fuel source operation preferably includes generating fuel at the fuel generator at the given rate, but can alternatively include pumping fuel to the fuel cell stack at the given rate. Generating fuel at the fuel generator at the given rate preferably includes maintaining the fuel storage composition at or above the degradation temperature to produce fuel. In this mode, the power adapter preferably determines the fuel production rate, adjusts the reactant supply accordingly, and maintains fuel production. Determining the fuel production rate functions to determine whether the cartridge is producing fuel at the desired rate. This step can include determining the fuel flow rate from the fuel cartridge, determining the cartridge temperature, determining changes in the mechanical or electrical properties of the fuel storage composition, or any other suitable method of determining cartridge fuel production. Adjusting the reactant supply preferably includes adjusting the heat provided to the fuel cartridge, but can alternatively include adjusting the pumping rate or any other suitable reactant supply parameter. Adjusting the heat provided to the fuel cartridge preferably includes providing more or less power from the battery, but can include conducting more or less waste heat from the fuel cell stack. Maintaining fuel production preferably includes providing the adequate amount of reactant to the fuel storage composition; more preferably, providing the adequate amount of heat to the fuel storage composition. Heat is preferably provided by resistive heaters powered by the battery, but the waste heat from the fuel cell assembly, the device, or any other suitable component can additionally be used to heat the cartridge.

The fuel cell mode can additionally include powering the device from the battery. This step is preferably performed only when fuel production is low (e.g., when the fuel cell system is starting up), or when the fuel cell system is not producing adequate power (e.g., wherein battery power supplements fuel cell power). Alternatively, the power produced by the fuel cell can be fed only to the battery, wherein the device is always charged from the battery. In a first variation, the battery supplements the power supplied by the fuel cell system to the device. In a second variation, the battery provides the full amount of power demanded by the device.

The fuel cell mode can additionally include charging the battery during fuel cell system operation, which functions to replenish the power consumed for fuel cartridge and/or fuel cell startup. The battery is preferably charged with fuel cell stack power produced in excess of power provided to the load, wherein the waste heat from the fuel cells and/or other components is enough to drive fuel production from the cartridge. The battery can alternatively be charged with more power (e.g., the load receives less power than demanded) or less power (e.g., wherein the excess power is converted into another source of energy, such as light or heat). The battery is preferably held at a partial charge (e.g., charged to a holding threshold, 90% of full capacity, 80% of full capacity, etc.), such that the battery can absorb the excess power produced from the excess fuel in the system when the fuel cell system is placed in an "off" state (e.g., the load is uncoupled from the power adapter, the fuel cell system is shut off, etc.). The holding threshold is preferably determined from the maximum amount of fuel that the system can produce after system shut-off, including the volume of the fuel flow paths and the amount of fuel produced during cartridge cool-down. However, the holding threshold can be determined in any suitable manner.

The power adapter can additionally operate in charging mode when the power adapter is electrically connected to the auxiliary power source, wherein the battery is preferably charged with power from the auxiliary power source in a manner similar to charging the battery to a predetermined state of charge in the auxiliary mode.

The power adapter preferably operates in pre-starting mode when the power adapter is electrically connected to the auxiliary power source, wherein the fuel cell system is preferably pre-started in a similar manner to fuel cell system pre-starting in the auxiliary mode.

In a first example of power adapter operation in auxiliary mode (shown in FIG. 13), the power adapter receives power from the auxiliary power source through the auxiliary power connector, and routes a first portion of the power through the device connector to the device. The power adapter simultaneously routes a second portion of the auxiliary power to the battery of the fuel cell, charging the battery to substantially full capacity. The power adapter can additionally simultaneously route a third portion of the auxiliary power to the fuel cell system, wherein the power is used to heat the fuel cells and the fuel storage composition within the fuel cartridge to operational temperature.

Figure 14:
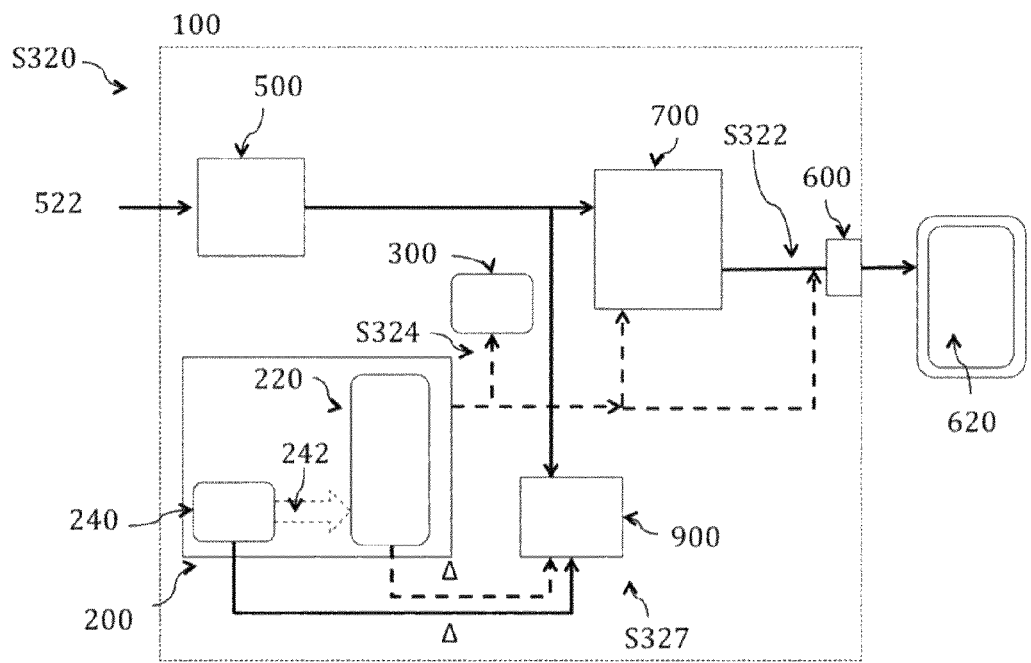
FIG. 14 is a schematic representation of the power adapter operating in a second variation of the auxiliary mode.

In a second example of power adapter operation in auxiliary mode (shown in FIG. 14), the power adapter receives power from the auxiliary power source through the auxiliary power connector, and routes a first portion of the power through the device connector to the device. A processor within the power adapter determines the operational state of the cartridge (e.g., from a cartridge temperature measurement, flow rate out of the cartridge, etc.). When the cartridge is in an operational state (e.g., producing fuel), the processor preferably activates a cooling system, external or internal to the power adapter, that cools the cartridge under the decomposition temperature. The battery preferably additionally absorbs the excess power produced by the fuel cell when the cartridge is in operational state, wherein auxiliary power can be used to supplement battery charging to substantially full capacity. Alternatively, the excess power can be provided to the load, wherein auxiliary power is used to supplement load power provision. A controller preferably controls excess power routing. When the cartridge is in a non-operational state (e.g., not producing fuel), battery power and/or auxiliary power is routed to the fuel cell system to heat the cartridge to a temperature just under the decomposition temperature. The processor can additionally determine the consumption state of the cartridge (e.g., from past cartridge operation history, a measurement of the fuel storage composition physical properties, etc.). When the cartridge consumption state is below a consumption threshold, the processor preferably facilitates cartridge replacement by cooling the cartridge to a replacement temperature (e.g., below 50° C., more preferably substantially near 20° C.).

In a third example of power adapter operation in auxiliary mode, the power adapter receives power from the auxiliary power source and routes the auxiliary power to the battery. Power is routed from the battery to the load. The battery preferably cooperatively conditions the auxiliary power for the load in conjunction with one or more power converters. The power adapter simultaneously routes a second portion of the battery power to the fuel cell system to heat the fuel cell stack to operational temperature and to pre-heat the fuel generator to a temperature below the decomposition temperature (e.g., ambient temperature or just below the decomposition temperature).

In a first example of power adapter operation in fuel cell mode (shown in FIG. 15), the power adapter determines that little to no power is being received from the auxiliary power source, and initiates fuel cell system operation. To achieve system operation, the power adapter preferably supplies power from the battery to the fuel generator to initiate fuel production. In one variation, the battery powers the heaters of the fuel generator to bring the fuel cartridge up to the decomposition temperature. The power adapter can additionally supply power to the fuel cells of the fuel cell stack to achieve and/or maintain the fuel cell operational temperature until adequate fuel flow is produced, wherein the exothermic fuel conversion reaction preferably maintains the fuel cell stack at operational temperatures. During steady state operation, the battery preferably supplies enough power to sustain continued fuel generation. In one variation, waste heat from the fuel cells is preferably used to maintain the cartridge at the degradation temperature, wherein heat generated from battery power is only used to supplement the waste heat. During steady state operation, any excess power produced by the fuel cell system is preferably used to charge the battery, or can be consumed as heat (and used to heat the cartridge). The battery is preferably charged to a holding threshold that is lower than the full battery capacity. This partially charged state allows the battery to absorb the excess power produced by the excess fuel in the system (e.g., fuel already produced, fuel being produced, and fuel to be produced as the cartridge cools down) when the load is disconnected from the power adapter (e.g., there is little to no load on the system).

In a second example of power adapter operation in fuel cell mode, the power adapter functions in substantially the same manner as the first example, except that the power adapter charges the device from the battery during fuel cell system start-up, as indicated in FIG. 15.

As a person skilled in the art will recognize from the previous detailed description and from the figures and claims, modifications and changes can be made to the preferred variations of the invention without departing from the scope of this invention defined in the following claims.

We claim:

1. A method of operating a power adapter for a load, the power adapter including a fuel cell system including a fuel supply and a fuel cell stack, the power adapter also including an energy storage device electrically connected to the fuel cell system, wherein the fuel supply comprises a fuel generator comprising a fuel storage composition storing fuel in a chemically bound form that thermolyses at a decomposition temperature to generate fuel, the method comprising:
    determining a connectivity state of an auxiliary power source with the energy storage device;
    determining a connectivity state of a load with the fuel cell system;
    selecting a power adapter operation mode based on the connection states of the auxiliary power source and the load, the operation modes comprising:
        an auxiliary mode when the auxiliary power source is connected to the energy storage device and the load is connected to the fuel cell system, comprising: providing power from the auxiliary power source to the load, and providing power to the fuel cell system, preheating the fuel storage composition to a temperature lower than the decomposition temperature with power from the auxiliary power source, measuring a parameter of the fuel cell system indicative of power generation from the fuel cell system, and ceasing power generation when the measured parameter indicates power generation by cooling the fuel supply below the decomposition temperature;
        a fuel cell mode when the auxiliary power source is disconnected from the energy storage device and the load is connected to the fuel cell system, comprising: providing fuel to the fuel cell stack from the fuel supply, generating power from the fuel by the fuel cell stack, and providing the generated power to the load; and,
    wherein the measured parameter is indicative of energy generation when the fuel supply temperature exceeds a decomposition temperature of a fuel storage composition of the fuel supply.

2. The method of claim 1, wherein pre-heating the fuel cell system comprises heating the fuel cell stack to a fuel cell stack operational temperature.

3. The method of claim 2, wherein heating the fuel cell stack to a fuel cell stack operational temperature comprises heating the fuel cell stack to the operational temperature with power from the auxiliary power source.

4. The method of claim 1, wherein the fuel source composes a fuel generator, wherein providing fuel to the fuel cell stack comprises providing power to the fuel generator to initiate fuel generation.

5. The method of claim 4, wherein providing power to the fuel generator to initiate fuel generation comprises powering one or more heaters in the fuel generator to thermolyse the fuel storage composition at the decomposition temperature.

6. The method of claim 5, wherein heating the fuel storage composition to the decomposition temperature comprises heating the fuel generator with power from the energy storage device.

7. The method of claim 1, further comprising selecting a pre-heating mode when the auxiliary power source is connected to the energy storage device, comprising pre-heating the fuel cell system.

8. The method of claim 1, wherein providing the generated power to the load further comprises supplementing the generated power with power from the energy storage device to meet a power demand from the load.

9. The method of claim 1, wherein measuring a parameter of the fuel cell system comprises measuring the temperature of the fuel supply.

10. The method of claim 1, wherein providing power from the auxiliary power source to the load comprises conditioning the auxiliary power into power suitable for the load and providing the conditioned power to the load.

11. The method of claim 10, wherein providing power from the auxiliary power source to the load comprises routing auxiliary power to the energy storage device, converting the auxiliary power into power suitable for the load at the energy storage device, and routing the power from the energy storage device to the load.

12. A power adapter for a load, the power adapter comprising:
    a fuel cell system comprising:
        a fuel generator that generates fuel from a fuel storage composition, the fuel storage composition storing fuel in chemically bound form that thermolyses at a decomposition temperature to generate fuel;
        a fuel cell stack, fluidly coupled to the fuel generator, that converts fuel from the fuel generator into electrical power;
    a rechargeable battery electrically connected to the fuel cell system that receives power from an auxiliary power source;
    a control circuit, electrically connected to the battery and the fuel cell system, that controls power provision from the battery to the fuel cell system, the control circuit operable between:
        a connected mode when the power conditioning unit is electrically connected to the auxiliary power source; and a disconnected mode when the power conditioning unit is electrically disconnected from the auxiliary power source and the load is electrically connected to the fuel cell system, wherein the control circuit powers the fuel cell system with power from the battery;

an energy generation control system connected to the fuel cell system that ceases energy generation by the fuel cell system upon satisfaction of a cessation condition, wherein the energy generation control system comprises one or more of a cooling system that cools the fuel supply below the decomposition temperature when the cessation condition is satisfied and a valve that seals a fuel flow path from the fuel supply to the fuel cell system when the cessation condition is satisfied; and, wherein the fuel generator comprises a heating element thermally connected to the fuel storage composition.

13. The power adapter of claim 12, wherein the battery has a maximum energy capacity large enough to simultaneously power the fuel cell system and the load for a predetermined period of time.

14. The power adapter of claim 12, further comprising a charging circuit, wherein the charging circuit regulates an amount of power supplied from the auxiliary power supply to the battery based on a state of charge of the battery and a rate of power consumption from the energy storage device.

15. The power adapter of claim 14, wherein the control circuit, when in connected mode, powers the load and the fuel cell system with power from the auxiliary power source.

16. The power adapter of claim 12, further comprising a power converter electrically connected to a battery inlet that converts power from the auxiliary power source into power suitable for the battery.

17. The power adapter of claim 16, wherein the power converter is located within an auxiliary power connector that removably connects to the battery and the auxiliary power source.

18. The power adapter of claim 12, further comprising a power converter electrically connected between the battery and the fuel cell system that converts power from the battery into power suitable for the fuel cell system.

19. The power adapter of claim 12, wherein the cessation condition is satisfied when the auxiliary power supply is connected to the energy storage device and a fuel flow rate from the fuel supply to the fuel cell stack is greater than a predetermined flow rate.

20. The power adapter of claim 12, wherein the energy generation control system comprises a cooling system comprising one or more of a fan, a cold plate, and a piezo-electric heat pump.

* * * * *